United States Patent [19]
Breton et al.

[11] Patent Number: 5,833,744
[45] Date of Patent: Nov. 10, 1998

[54] WATERFAST INK JET INKS CONTAINING A SURFACTANT

[75] Inventors: Marcel Philippe Breton, Mississauga; John F. Oliver, Calgary, both of Canada

[73] Assignee: Xerox Corporation, Stamford, Conn.

[21] Appl. No.: 783,591

[22] Filed: Jan. 13, 1997

[51] Int. Cl.[6] .................................................. C09D 11/02
[52] U.S. Cl. ................................... 106/31.59; 106/31.89; 106/31.58; 106/31.86
[58] Field of Search .............................. 106/31.59, 31.89, 106/31.58, 31.86

[56] References Cited

U.S. PATENT DOCUMENTS

| | | | |
|---|---|---|---|
| 4,295,889 | 10/1981 | Eida et al. ............................. | 106/31.43 |
| 4,325,735 | 4/1982 | Ohta et al. ............................. | 106/31.58 |
| 4,327,174 | 4/1982 | von Meer ................................. | 480/530 |
| 4,737,190 | 4/1988 | Shimada et al. ....................... | 106/31.48 |
| 5,106,416 | 4/1992 | Moffatt et al. ........................ | 106/31.59 |
| 5,114,477 | 5/1992 | Mort et al. ............................ | 106/31.76 |
| 5,116,409 | 5/1992 | Moffatt .................................. | 106/31.59 |
| 5,156,675 | 10/1992 | Breton et al. ......................... | 106/31.58 |
| 5,169,437 | 12/1992 | You ........................................ | 106/31.58 |
| 5,207,824 | 5/1993 | Moffatt et al. ........................ | 106/31.58 |
| 5,220,346 | 6/1993 | Carreira et al. ...................... | 106/31.64 |
| 5,356,464 | 10/1994 | Hickman et al. ..................... | 106/31.58 |
| 5,393,461 | 2/1995 | Fillipova ............................... | 106/31.25 |

*Primary Examiner*—Helene Klemanski
*Attorney, Agent, or Firm*—Oliff & Berridge, PLC

[57] ABSTRACT

An ink for thermal ink jet printing which includes water, a co-solvent and a paper specific surfactant comprising a paper pulp debonding agent, such as Berocell™ 584 or Berocell™ 078.

24 Claims, 1 Drawing Sheet

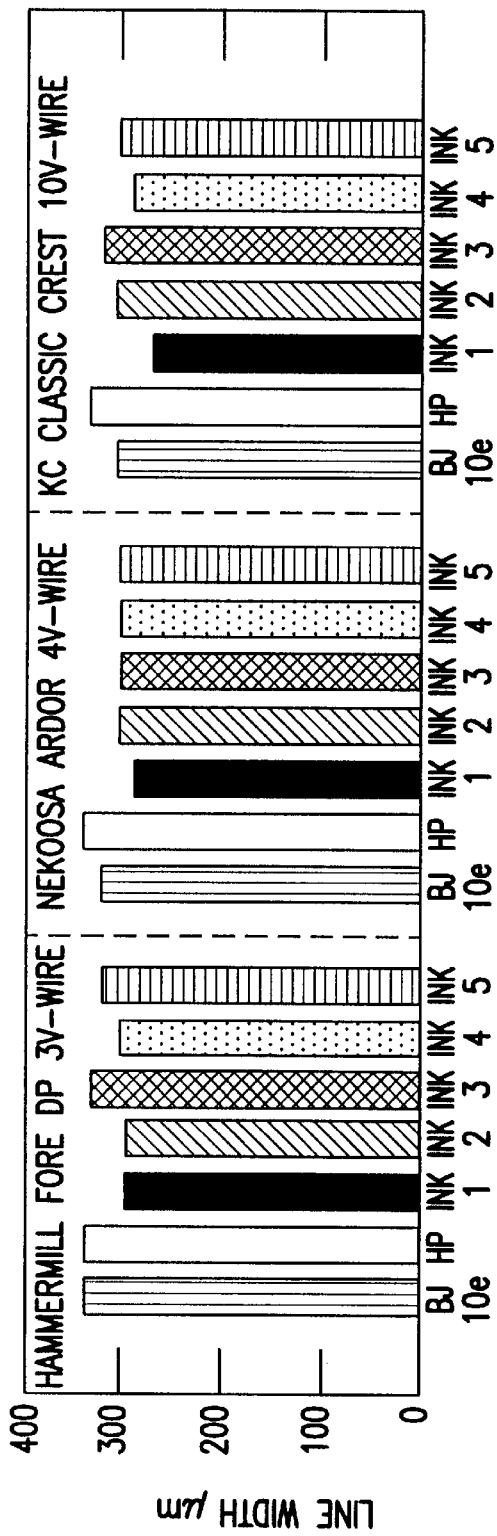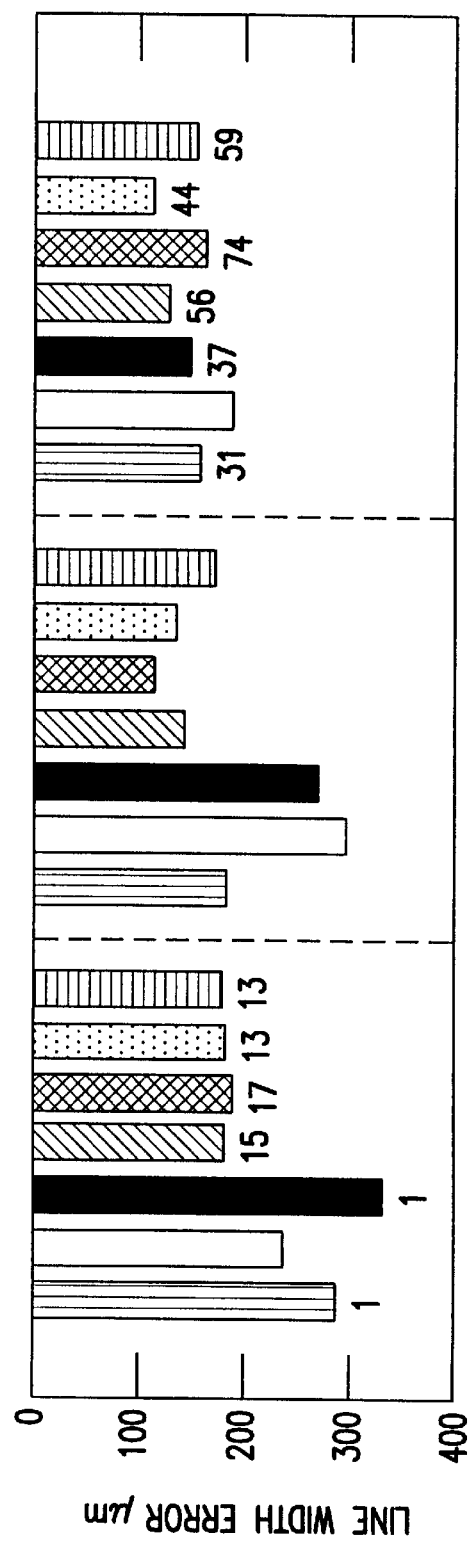
FIG.1A
FIG.1B

WATERFAST INK JET INKS CONTAINING A SURFACTANT

BACKGROUND OF THE INVENTION

This invention relates to improved aqueous ink compositions for use in ink jet printing processes. More particularly, this invention relates to ink jet inks having reduced surface tension and improved image quality, such as low image raggedness and good line edge definition.

Ink jet printing is a non-impact printing method that produces droplets of ink that are deposited on a substrate such as paper or transparent film in response to an electronic digital signal. Thermal or bubble jet drop-on-demand ink jet printers have found broad application as output for personal computers in the office and in the home.

Ink jet printing processes and apparatus for such processes are well known in the art. In thermal ink jet printing processes, the printer typically employs a resistor element in a chamber provided with an opening for ink to enter from a plenum. The plenum is connected to a reservoir for storing the ink. A plurality of such resistor elements are generally arranged in a particular pattern, called a primitive, in a printhead. Each resistor element is associated with a nozzle in a nozzle plate, through which ink is expelled toward a print medium, such as paper. The entire assembly of printhead and reservoirs comprises an ink jet pen. In operation, each resistor element is connected via a conductive trace to a microprocessor, where current-carrying signals cause one or more selected elements to heat up. The heating creates a bubble of ink in the chamber, which is expelled through the nozzle toward the print medium. In this way, firing of a plurality of such resistor elements in a particular order in a given primitive forms alphanumeric characters, performs area-fill, and provides other print capabilities on the medium. The thermal ink jet printing process is described in more detail, for example, in U.S. Pat. Nos. 5,169,437 to You and 5,207,824 to Moffatt et al., the entire disclosures of which are incorporated herein by reference.

It is necessary that the ink being used in this process meet various stringent performance characteristics. Such performance characteristics are generally more stringent than those for other liquid ink applications, such as for writing instruments (e.g., a fountain pen, felt pen, etc.). In particular, the following conditions are generally required for inks utilized in ink jet printing processes:

(1) the ink should possess liquid properties such as viscosity, surface tension and electric conductivity matching the discharging conditions of the printing apparatus, such as the form and material of printhead orifices, the diameter of orifices, etc.;

(2) the ink should be capable of being stored for a long period of time without causing clogging of printhead orifices during use;

(3) the recording liquid should be quickly fixable onto recording media, such as paper, film, etc., such that the outlines of the resulting ink dots are smooth and there is minimal blotting of the dotted ink;

(4) the resultant ink image should be of high quality, such as having a clear color tone, high density, and high color gamut;

(5) the resultant ink image should exhibit excellent waterfastness (water resistance) and lightfastness (light resistance);

(6) the ink should not chemically attack, corrode or erode surrounding materials such as the ink storage container, printhead components, orifices, etc.;

(7) the ink should not have an unpleasant odor and should not be toxic or inflammable; and (8) the ink should exhibit low foaming and high pH stability characteristics.

Various inks for ink jet printing processes are known in the art. For example, various ink jet inks are disclosed in U.S. Pat. Nos. 4,737,190 to Shimada et al. and 5,156,675 to Breton et al. Generally, the ink jet inks used in the art are aqueous inks, comprising a major amount of water, a humectant and/or a co-solvent, and a dye. By selecting specific surfactants, humectants, dyes, or other components, it is possible to adjust the print characteristics of the resultant ink. For example, U.S. Pat. Nos. 5,106,416 and 5,116,409 to Moffatt disclose the use of zwitterionic surfactants to prevent intercolor bleed.

Although numerous ink jet inks are presently available, they generally do not meet all of the above-described requirements, while also providing excellent print quality on the wide variety of plain papers generally used in the home and office. In particular, the inks generally used in ink jet printing processes, while producing acceptable print quality, do not produce the high print quality that is achieved by using dry toner compositions, such as in electrostatographic imaging processes.

The need continues to exist in the ink jet industry for improved ink jet inks that satisfy the above-described requirements while providing high quality prints on a wide variety of recording media, including plain paper. Although some currently available ink jet inks may provide waterfast images with better substrate latitude, the inks are unacceptable in that they generally smear and have poor latency and maintainability characteristics. In addition, such inks are generally difficult to manufacture. Thus, there is still a need in the ink jet ink industry for improved black and colored inks that can be easily prepared and obtained at a lower cost.

There is also a need in the art for new aqueous ink compositions containing dyes, pigments, or mixtures thereof that can be utilized in high resolution ink jet printers. There is also a need for inks that provide high optical density, not only for printing in a single application or pass (for high speed printing) but also in multiple passes. Furthermore, there is a need to provide inks that are capable of printing at high speed. This requires a high jetting frequency response (e.g., greater than 5.0 kHz, and preferably greater than 8.0 kHz).

Aqueous inks used in ink jet printing generally have water as a major component. Water has the advantage of being non-toxic, non-combustible and environmentally sound relative to non-aqueous inks, which are largely composed of organic solvents. Water is also an excellent media for dispersed pigments or dissolved dyes.

The use of water in large concentrations, however, also has several disadvantages, as disclosed in U.S. Pat. No. 5,356,464 to Hickman et al. Water has a slow evaporation rate relative to low-boiling organic solvents, which reduces the rate of drying and the rate of printing. Water also interacts with paper to cause two major distortions known as paper cockle and paper curl. Paper cockle is a distortion in which bumps, indentations and other irregularities are randomly produced on the printed paper, giving the paper a "wrinkled" or "wavy" appearance. Curl is a phenomenon in which the edges of the paper migrate towards the center of the paper. In extreme cases, curl causes the paper to assume the shape of a scroll. The directional curl may be on the printed side of the paper, or it may be on the non-printed side (the latter being known as "reverse curl").

The use of heating elements (commonly employed to increase the rate of drying of aqueous inks) is known to accelerate paper curl. Various mechanical devices to reduce curl such as heated rollers and tension applicators have been tried. These devices are only marginally effective and add considerably to the cost and size of the printer. Heated rollers used to reduce curl differ from the heaters used to increase drying rate, such as microwave heating, radiant heating, forced hot air heating, convection heating, and the like. In heaters to reduce curl, heat is applied to both sides of the paper after printing; in heaters to increase the drying rate, heat is applied during the printing process. Microwave dryers, for example, are set forth in U.S. Pat. Nos. 5,220,346 to Carreira et al. and 4,327,174 to von Meer, the disclosures of which are incorporated herein by reference. The inks employed in ink jet printers having microwave dryers include metal salts that improve the rate of drying. Such additives, however, increase the rate of paper curl.

In an effort to reduce paper cockle and curl in ink jet printers, efforts have been made to provide anti-curl and anti-cockle agents to reduce this problem. For example, U.S. Pat. No. 5,356,464 to Hickman et al. describes anti-curl agents that may be utilized in ink jet inks. U.S. Pat. No. 5,207,824 to Moffatt et al. describes an ink jet ink comprising an anti-cockle agent for thermal ink jet printers.

Another problem encountered in employing aqueous ink jet ink compositions is kogation. Occasionally, as ink in an ink jet is heated and vaporized, the ink will undergo thermal breakdown. This decomposition leads to residue deposition on the resistor's surface in a process known in the art as "kogation." Such deposits insulate the thermal heating of ink drops on the resistor surface, thereby causing reduced bubble formation, decreased ejection velocity of the ink drops, and reduced drop volume delivered to the substrate. Consequently, print quality is reduced and failure in bubble formation may result in failure of the ink jet printer to print. Thus, ink jet ink compositions employing humectants that reduce the rate of evaporation of the ink jet ink composition, thereby reducing the rate of crusting and clogging of the ink jet, and that provide reduced kogation problems are particularly desirable.

Therefore, thermal ink jet inks that have quicker drying times and improved print quality while reducing curl and kogation are desired. However, at least two of these problems, reduced drying time and increased quality, are inversely related on plain papers. Inks that have a fast drying time generally have a low surface tension ($\gamma$<40 mN/m) at 25° C. These inks also generally have poor line edge definition. However, they offer improved graphics quality, such as solid area uniformity and intercolor bleed. Usually, to achieve a faster drying time, surfactants are added to the ink to reduce surface tension, thereby also causing poorer text image definition.

In contrast, slow drying inks ($\geq$8 sec.) have a higher surface tension ($\gamma$>40 mN/m). This produces lower image raggedness and improved line edge definition. These inks have even been known to approach the quality of laser xerography. The higher surface tension results in less ink spreading and absorption into the fibers, causing increased drying by evaporation.

SUMMARY OF THE INVENTION

The thermal ink jet inks of the present invention have a reduced surface tension while maintaining a high quality text image. These inks can be employed as both dye-based and pigment-based inks.

The present invention provides thermal ink jet ink compositions that have excellent waterfastness and high print quality on a wide variety of print media, including paper and transparencies. Ink compositions of the present invention also meet the various end-user requirements described above, including wide color gamut, gloss, lightfastness, high stability, improved drying time and reduced odor retention and toxicity while being compatible with the thermal ink jet printing environment and apparatus. Thermal ink jet ink compositions of the present invention also provide significantly improved print quality on plain paper as compared to other ink compositions.

Specifically, the present invention provides ink compositions for ink jet printing comprising a surfactant for lowering surface tension while maintaining high print quality in slow drying inks ($\geq$8 sec.).

BRIEF DESCRIPTION OF FIGURE

FIGS. 1A and 1B are bar graphs showing line width, line width error and drying time for various ink compositions.

DETAILED DESCRIPTION OF PREFERRED EMBODIMENTS

The thermal ink jet ink of the present invention is composed of a liquid vehicle, a surfactant and colorant.

The liquid vehicle generally comprises water with a co-solvent. In embodiments, it is preferred that the co-solvent is a miscible organic component. Examples of suitable co-solvents include, but are not limited to, ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones such as sulfolane, alcohol derivatives, carbitol, butyl carbitol, cellusolve, ether derivatives, amino alcohols, ketones, N-methylpyrrolidinone, N-ethylpyrrolidinone, 2-pyrrolidone, cyclohexylpyrrolidone, hydroxyethers, amides, sulfoxides such as dimethyl sulfoxide, lactones, imidazole, mixtures thereof and the like.

When mixtures of water and one or more co-solvents are selected as the liquid vehicle, the ratio of water to co-solvent may be in any effective range. Typically the ratio of water to co-solvent is from about 100:0 to about 30:70, preferably from about 97:3 to about 50:50, although the ratio can be outside these ranges. The non-water component of the liquid vehicle, when present, generally serves as a humectant and/or curl additive or a dye solubilizer, which typically has a boiling point higher than that of water.

The surfactant should preferably be water soluble, nonionic or cationic and have a strong specificity for paper. Examples of surfactants useful in the invention are sodium lauryl sulphate, n-lauryl sarcosine, sodium dodecylbenzene sulphonate, and like substances. Preferably, the surfactant is selected from Berocell™ surfactants, available from Eka Nobel Inc., Paper Chemicals Division. Most preferably, the surfactant is either Berocell™ 548 or Berocell™ 078.

The Berocell™ surfactants are either cationic, non-ionic, or a mixture of both. They generally consist of a hydrophilic head and a hydrophobic tail section. They are most commonly used for pulp debonding or as anti-self-sizing agents because of their strong substantivity to cellulosic surfaces. In particular, Berocell™ 584 has a low net cationic activity and is composed of a mixture of alkoxylated quarternary ammonium chloride and two different alkoxylated ethers. It is soluble in hot water, but requires a co-solvent for dispersion in cold water. Berocell™ 078 is non-ionic and consists of fatty alcohol propoxylates.

The use of a paper specific surfactant, and specifically a Berocell™ surfactant, results in a lowered surface tension of the ink jet ink without affecting text image quality. Specifically, the Berocell™ surfactants are adsorbed at the paper surface in a head-down position, where the hydrophilic head is adsorbed into the paper and the hydrophobic tail is left at the paper surface. This lowers surface tension but maintains text image quality by enhancing the adsorption of the ink into the paper while minimizing lateral spreading.

The surfactant should be present in an amount equal to or greater than the critical micelle concentration (CMC), or in an amount of from about 0.0001% by weight of the entire ink composition to about 0.1% by weight. Preferably, the surfactant is present in an amount of from about 0.001% to 0.1% by weight. More preferably, the surfactant is present in an amount of from about 0.005% to 0.05% by weight. More preferably, the surfactant should be present in dye based inks in an amount of from about 0.01% to about 0.03% by weight of the ink composition. For pigmented inks, the surfactant should be present in an amount of from about 0.1% to about 0.3% by weight of the ink composition.

The colorant for use in ink compositions of the present invention may be selected from any suitable water-soluble dye or pigment, or a combination thereof. Preferably, the colorant is anionic. The colorant may be present with or without a dispersing agent.

When dyes are used in the ink jet inks of the present invention, any suitable commercially available dye may be used to impart the desired color characteristics to the ink jet ink. Specific examples of anionic dyes include Bernacid Red 2BMN, Pontamine Brilliant Bond Blue A, Pontamine, Food Black 2, Carodirect Turquoise FBL Supra Conc. (Direct Blue 199, Carolina Color and Chemical), Special Fast Turquoise 8GL Liquid (Direct Blue 86, Mobay Chemical), Intrabond Liquid Turquoise GLL (Direct Blue 86, Crompton and Knowles), Cibracron Brilliant Red 38-A (Reactive Red 4, Aldrich Chemical), Drimarene Brilliant Red X-2B (Reactive Red 56, Pylam, Inc.), Levafix Brilliant Red E-4B (Mobay Chemical), Levafix Brilliant Red E-6BA (Mobay Chemical), Pylam Certified D&C Red #28 (Acid Red 92, Pylam), Direct Brill Pink B Ground Crude (Crompton & Knowles), Cartasol Yellow GTF Presscake (Sandoz, Inc.), Tartrazine Extra Conc. (FD&C Yellow #5, Acid Yellow 23, Sandoz, Inc.), Carodirect Yellow RL (Direct Yellow 86, Carolina Color and Chemical), Cartasol Yellow GTF Liquid Special 110 (Sandoz, Inc.), D&C Yellow #10 (Acid Yellow 3, Tricon), Yellow Shade 16948 (Tricon), Basacid Black X34 (BASF), Carta Black 2GT (Sandoz, Inc.), Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Aizen Spilon Yellow C-GNH (Hodagaya Chemical Company), Spirit Fast Yellow 3G, Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI Americas), Morfast Black Conc A (Morton-Thiokol), Diazol Black RN Quad (ICI Americas), Orasol Blue GN (Ciba-Geigy), Savinyl Blue GLS (Sandoz, Inc.), Luxol Blue MBSN (Morton-Thiokol), Sevron Blue 5GMF (ICI Americas), and Basacid Blue 750 (BASF); Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, all available from Bayer; Procion Turquoise PA, Procion Turquoise HA, Procion Turquoise Ho5G, Procion Turquoise H-7G, Procion Red MX-5B, Procion Red H8B (Reactive Red 31), Procion Red MX 8B GNS, Procion Red G, Procion Yellow MX-8G, Procion Black H-EXL, Procion Black P-N, Procion Blue MX-R, Procion Blue MX-4GD, Procion Blue MX-G, and Procion Blue MX-2GN, all available from ICI Americas; Cibacron Red F-B, Cibacron Black BG, Lanasol Black B, Lanasol Red 5B, Lanasol Red B, and Lanasol Yellow 46, all available from Ciba-Geigy; Baslien Black P-BR, Baslien Yellow EG, Baslien Brilliant Yellow P-3GN, Baslien Yellow M-6GD, Baslien Brilliant Red P-3B, Baslien Scarlet E-2G, Baslien Red E-B, Baslien Red E-7B, Baslien Red M-5B, Baslien Blue E-R, Baslien Brilliant Blue P-3R, Baslien Black P-BR, Baslien Turquoise Blue P-GR, Baslien Turquoise M-2G, Baslien Turquoise E-G, and Baslien Green E-6B, all available from BASF; Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, all available from Sumitomo Chemical Company; Intracron Yellow C-8G, Intracron Red C-8B, Intracron Turquoise Blue GE, Intracron Turquoise HA, and Intracron Black RL, all available from Crompton and Knowles, Dyes and Chemicals Division; mixtures thereof, and the like. Dyes that are invisible to the naked eye but detectable when exposed to radiation outside the visible wavelength range (such as ultraviolet or infrared radiation), such as dansyl-lysine, N-(2-amino-ethyl)-4-amino-3,6-disulfo-1,8-dinaphthalimide dipotassium salt, N-(2-aminopentyl)-4-amino-3,6-disulfo-1,8-dinaphthalimide dipotassium salt, Cascade Blue ethylenediamine trisodium salt (available from Molecular Proes, Inc.), Cascade Blue cadaverine trisodium salt (available from Molecular Proes, Inc.), bisdiazinyl derivatives of 4,4'-diaminostilbene-2,2'-disulfonic acid, amide derivatives of 4,4'-diaminostilbene-2,2'-disulfonic acid, phenylurea derivatives of 4,4'-disubstituted stilbene-2,2'-disulfonic acid, mono- or di-naphthyltriazole derivatives of 4,4'-disubstituted stilbene disulfonic acid, derivatives of benzithiazole, derivatives of benzoxazole, derivatives of benzimidazole, derivatives of coumarin, derivatives of pyrazolines containing sulfonic acid groups, 4,4'-bis(triazin-2-ylamino)stilbene-2,2'-disulfonic acids, 2-(stilben-4-yl)naphthotriazoles, 2-(4-phenylstilben-4-yl)benzoxazoles, 4,4-bis(triazo-2-yl)stilbene-2,2'-disulfonic acids, 1,4-bis(styryl)-biphenyls, 1,3-diphenyl-2-pyrazolines, bis(benzazol-2-yl) derivatives, 3-phenyl-7-(triazin-2-yl)coumarins, carbostyrils, naphthalimides, 3,7-diaminodibenzothiophen-2,8-disulfonic acid-5,5-dioxide, other commercially available materials, such as C.I. Fluorescent Brightener No. 28 (C.I. 40622), the fluorescent series Leucophor B-302, BMB (C.I. 290), BCR, BS, and the like (available from Leucophor), and the like, are also suitable.

Examples of additional suitable dyes include, but are not limited to, anthraquinones; monoazo dyes; disazo dyes; phthalocyanines; aza[18]annulenes; formazan copper complexes; Bernacid Red (Berncolors, Poughkeepsie, N.Y.); Pontamine Brilliant Bond Blue; Berncolor A. Y. 34; Telon Fast Yellow 4GL-175; Basacid Black SE 0228 (BASF); the Pro-Jet series of dyes available from ICI, including Pro-Jet Yellow I (Direct Yellow 86), Pro-Jet Magenta I (Acid Red 249), Pro-Jet Cyan I (Direct Blue 199), Pro-Jet Black I (Direct Black 168), and Pro-Jet Yellow 1-G (Direct Yellow 132); Pro-Jet Fast Yellow, Cyan and Magenta (Zeneca Inc.); Aminyl Brilliant Red F-B (Sumitomo Chemical Co.); the Duasyn line of "salt-free" dyes available from Hoechst, such as Duasyn Direct Black HEF-SF (Direct Black 168), Duasyn Black RL-SF (Reactive Black 31), Duasyn Direct Yellow 6G-SF VP216 (Direct Yellow 157), Duasyn Brilliant Yellow GL-SF VP220 (Reactive Yellow 37), Duasyn Acid Yellow XX-SF VP413 (Acid Yellow 23), Duasyn Brilliant Red F3B-SF VP218 (Reactive Red 180), Duasyn Rhodamine B-SF VP353 (Acid Red 52), Duasyn Direct Turquoise Blue FRL-SF VP368 (Direct Blue 199), and Duasyn Acid Blue AE-SF VP344 (Acid Blue 9); mixtures thereof; and the like.

In addition, the colorant for the ink jet ink compositions of the present invention may be a pigment, or a mixture of one or more dyes and/or one or more pigments. The pigment may be black, cyan, magenta, yellow, red, blue, green, brown, mixtures thereof, and the like. Examples of suitable black pigments include various carbon blacks such as channel black, furnace black, lamp black, and the like, such as Levanyl Black A-SF (Miles, Bayer) CAB-O-JET 200™ and CAB-O-JET 300™ (Cabot) and Sunsperse Carbon Black LHD 9303 (Sun Chemicals). Colored pigments include red, green, blue, brown, magenta, cyan, and yellow particles, as well as mixtures thereof. Illustrative examples of magenta pigments include 2,9-dimethyl-substituted quinacridone and anthraquinone, identified in the Color Index as CI 60710, CI Dispersed Red 15, CI Solvent Red 19, and the like. Illustrative examples of suitable cyan pigments include copper tetra-4-(octadecyl sulfonamido) phthalocyanine, X-copper phthalocyanine pigment, listed in the Color Index as CI 74160, CI Pigment Blue, and Anthradanthrene Blue, identified in the Color Index as CI 69810, Special Blue X-2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Permanent Yellow FGL, and the like. Additional examples of pigments include Normandy Magenta RD-2400 (Paul Uhlich), Sunsperse Quindo Magenta QHD 6040 (Sun Chemicals), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900 and L7020 (BASF), Heliogen Blue D6840 and D7080 (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Tolidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), and Lithol Fast Scarlet L4300 (BASF).

Additional suitable commercially available pigment dispersions include: the Hostafine® pigments available from Hoechst Celanese Corporation, including Hostafine Black T, Hostafine Black TS, Hostafine Yellow HR, Hostafine Yellow GR, Hostafine Red FRLL, Hostafine® Rubine F6B, Hostafine® Blue B2G, and the like; pigment dispersions available from Bayer company including Levanyl® Yellow 5GXZ-SF, and the like; pigment dispersions available from Degussa Company including Derussol® carbon black pigment dispersions comprising Derussol® Z35OS, Derussol® VU 25/L, Derussol® 345, and Derussol® 345OS; pigment dispersions available from BASF Corporation, including Disperse Black 006607, Luconyl® Yellow 1250, Basoflex Pink 4810, and Luconyl® Blue 7050, and the like; and pigment dispersions available from Sun Chemical Corporation including, Sunsperse® Red RHD 9365, Sunsperse® Magenta W83012, and the like. Other suitable pigments having the criteria set forth below can also be selected.

The referred pigments for the ink jet inks of the present invention are nontoxic and AMES test negative materials (non-mutagenic carbon blacks and color pigments) that include nonmutagenic and noncarcinogenic pigments for safety reasons. For example, it is desired to have pigments, including carbon blacks and color pigments, that have a very low concentration of polyaromatic hydrocarbons, which are known to be carcinogenic or mutagenic. For illustrative purposes, nitropyrene, pyrene, tetracene, pentacene, and many other polyaromatic hydrocarbons in many commercial carbon blacks and color pigments are considered to be toxic at a concentration greater than 5 parts per million. Thus, it is desirable to limit the amount of such toxic polyaromatic hydrocarbons in the pigments to less than 5 parts per million for the preparation of nontoxic ink jet inks. Many commercial carbon blacks and colored pigments have a concentration of polyaromatic hydrocarbons exceeding 5 part per million and, therefore, the inks derived from such pigments are generally considered to be toxic or failing to pass the AMES test. However, many nontoxic carbon blacks and color pigments including Raven® 5250, Raven® 5750, Regal® 330, Black Pearl® 1300, Black Pearls® L, Vulcan® XC-7, Hostapern® pink E, Hostaperm® blue (a phthalocyanine derivative) and other pigments are generally used in toners and other imaging applications. Those carbon blacks and color pigments usually have a polyaromatic hydrocarbon content of less than 1 part per million which is below the limit of 5 parts per million that is considered toxic. They do not show positive response in the AMES test and are considered to be safe in toner and ink jet ink applications.

Preferably, in embodiments of the present invention where pigments are used, the pigment particle size is as small as possible to enable a stable dispersion of the particles in the liquid vehicle and to prevent clogging of the ink channels or nozzle when the ink is used in an ink jet printer. Preferred particle average diameters are generally from about 0.001 to about 0.3 micron, although the particle size can be outside this range in specific embodiments. Preferably, at least 70% of the pigment particles should have an average particle diameter of less than about 0.1 micron for carbon blacks and 0.3 micron for color pigments.

In embodiments of the present invention where dyes are used, the dye is present in the ink jet ink composition in any effective amount to provide a desired color. Typically the dye is present in an amount of from about 1 to about 15% by weight of the ink composition, and preferably from about 2 to about 8% by weight (wherein the amount refers to an amount of dye molecules present in the ink), although the amount can be outside this range. A mixture of dyes in the proportions desired to obtain a specific shade may also be employed.

Similarly, in embodiments of the present invention where pigments are used, the pigment may be present in the ink jet ink composition in any effective amount. Typically the pigment is present in an amount of from about 1% to about 10% by weight of the ink composition and preferably from about 2% to about 8% by weight, although the amount can be outside of this range. Where both dyes and pigments are incorporated into the ink jet ink composition, the weight percentage of the combined colorant may be adjusted accordingly.

In embodiments of the present invention, the pigment may be dispersed in the ink with one or more dispersants. The dispersants can be anionic, cationic, or nonionic. Preferred dispersants are ionic dispersants that have both ionic (capable of ionization in water) and hydrophobic (affinity for pigments) moieties. Suitable dispersants include, but are not limited to, anionic dispersants, such as polymers and copolymers of styrene sulfonate salts (such as $Na^+$, $Li^+$, $K^+$, $Cs^+$, $Rb^+$, substituted and unsubstituted ammonium cations, and the like) or naphthalene sulfonate salts, (such as $Na^+$, $Li^+$, $K^+$, $Cs^+$, $Rb^+$, substituted and unsubstituted ammonium cations, and the like), unsubstituted and substituted naphthalene sulfonate salts (e.g. alkyl, alkoxy, substituted naphthalene derivatives, and the like) and an aldehyde derivative (such as unsubstituted alkyl aldehyde derivatives including formaldehyde, acetaldehyde, propylaldehyde, and the like), mixtures thereof, and the like, either in solid form or water solutions. Examples of such dispersants include commercial products such as Versa® 4, Versa® 7 and Versa® 77 (National Starch and Chemical Co.); Lomar® D (Diamond Shamrock Chemicals Co.); Daxad® 19 and Daxad® K (W.R. Grace Co.); Tamol® SN (Rohm & Haas); and the like. The more preferred dispersants comprise naphthalene sulfonate salts, especially a condensation product of naphthalenesulfonic acid and formaldehyde, and its salts (such as $Na^+$, $Li^+$, $K^+$, $Cs^+$, $Rb^+$, substituted and unsubstituted ammonium cations, and the like). Also, nonionic dispersants or surfactants can be used in ink jet inks of the present invention, such as ethoxylated monoalkyl or dialyky phenols including Igepal® CA and CO series materials (Rhone-Poulenc Co.) and Triton® series materials (Union Carbide Company). These nonionic surfactants or dispersants can be used alone or in combination with the aforementioned anionic dispersants.

The ratio of pigment to aforementioned pigment dispersant(s) according to the present invention ranges from about 1:0.01 to about 1:3, preferably from about 1:0.1 to about 1:1, and most preferably from about 1:0.15 to about 1:0.5. The ratio of naphthalene substituent to aldehyde (e.g. formaldehyde, acetaldehyde, etc.) in the aforementioned anionic dispersant condensation product is generally about 1:1, although this ratio can be different depending on the stoichiometry of the feed stock and reaction condition, and can readily be adjusted to obtain a dispersant having a desired molecular weight and the desired ratio of naphthalene substituent to aldehyde. The remainder of the dispersant may comprise nonactive ingredients such as water, solvent or humectant. The weight-average molecular weight of the dispersant is generally less than 20,000, preferably less than 13,000, and more preferably less than 10,000. The pigment dispersion should contain enough dispersant to stabilize the pigment particle dispersion, but not so much as to adversely affect properties of the dispersion such as viscosity, stability, and optical density. The dispersant should also be in appropriate amounts so as to minimize dry smear of the produced images on paper and transparencies.

The ink jet inks of the present invention also may contain a penetrant to avoid inter-color bleeding. The penetrant gives the ink a lower surface tension, generally less than about 55 dynes/cm at 25° C. and preferably less than about 45 dynes/cm. Preferably, the ink jet inks of the present invention have a surface tension of from about 20 to about 55 dynes/cm, and more preferably from about 30 to about 45 dynes/cm. The viscosity of the ink composition is usually less than about 15 cPs at 25° C., preferably from about 1 cP to about 8 cPs, and more preferably from about 1 cP to about 5 cPs.

Humectants may also be added to the inks of the present invention to prevent water evaporation and pigment sedimentation. Additionally, certain humectants such as N-methyl-pyrrolidone and 2-pyrrolidone have been found to improve dye solubility in the ink and thus serve the dual role as humectant and co-solvent. In addition, some humectants such as 2-pyrrolidone have been found to resist ink build-up on jet faces during extended printing, which is preferred for cartridge refillability. When incorporated into the inks of the present invention, one or more humectants may be added to the ink in an amount of approximately 1% to 30% by weight of the ink composition to prevent sediment build-up on print heads. When present, such additives may include any of the various known humectants and co-solvents which include, but are not limited to, glycols, such as ethylene glycol, diethylene glycol, propylene glycol, dipropylene glycol, polyethylene glycol, polypropylene glycol, and the like; triols, such as glycerine, trimethylolpropane, triols containing 2 to 10 carbon atoms, and the like; diols containing 2 to 10 carbon atoms such as 1,5-pentanediols, 1,6-hexanediols, and the like; sulfoxides, such as dialkylsulfoxide, dimethylsulfoxide, alkylphenyl sulfoxides, and the like; sulfones, such as sulfolane, dialkyl sulfones, alkyl phenyl sulfones, and the like; amides, such as N,N-dialkyl amides, N,N-alkyl phenyl amides, N-methylpyrrolidinone, N-cyclohexylpyrrolidinone, N,N-diethyltoluamide, and the like; ethers, such as alkyl ether derivatives of alcohol, etherdiols, and ethertriols including butylcarbitol, alkyl ethers of polyethyleneglycols, and the like; urea; betaine; as well as the thio (sulfur) derivatives of the aforementioned materials such as thioethyleneglycol, trithio- or dithio-ethyleneglycol, and the like; derivatives thereof; mixtures thereof, and the like.

The ink jet inks of the present invention may optionally include a water soluble or miscible microwave coupler. The microwave coupler can be selected from any of the known microwave couplers, and can be an organic or inorganic salt or a nonionic microwave coupling agent that allows an ink to be dried quickly by a microwave heating device. Examples of such salts include, but are not limited to, ammonium bromide, ammonium chloride, ammonium iodide, ammonium formate, ammonium acetate, ammonium propionate and some metal salts. In embodiments of the present invention, the microwave coupler can be included in the ink jet inks in an amount of from about 1% to about 5% by weight of the ink composition, and preferably in an amount of from about 2% to about 4% by weight.

The ink jet inks of the present invention may optionally include a jetting aid such as polyethylene oxide. A preferred polyethylene oxide is one having a weight-average molecular weight of about 18,500 at a concentration of about 0.01–0.5% by weight of the ink composition, and preferably a concentration of less than 0.1% by weight. The jetting aid provides smooth jetting or jetting with low jitter.

Examples of buffering agents that may be included are agents such as sodium borate, sodium hydrogen phosphate, sodium dihydrogen phosphate, mixtures thereof and the like.

pH controlling agents may also be included in the ink, if desired. Examples of such pH controlling agents suitable for inks of the present invention include, but are not limited to, acids; bases, including hydroxides of alkali metals such as lithium hydroxide, sodium hydroxide and potassium hydroxide; phosphate salts; carbonate salts; carboxylate salts; sulfite salts; amine salts; amines such as diethanolamine and triethanolamine; mixtures thereof and the like. When present, the pH controlling agent is preferably included in an amount of up to about 10% by weight of the ink composition, preferably from about 0.001% to 5.0% by weight, and more preferably from about 0.01% to about 5% percent by weight, although the amounts can be outside these ranges.

Polymeric chemical additives can also be added to the ink jet inks of the present invention to enhance the viscosity of the ink. Suitable polymeric additives include, but are not limited to, water soluble polymers such as Gum Arabic, polyacrylate salts, polymethacrylate salts, polyvinyl alcohols, hydroxy propylcellulose, hydroxyethylcellulose, polyvinylpyrrolidinone, polyvinylether, starch, polysaccharides, polyethyleneimines derivatized with polyethylene oxide and polypropylene oxide, such as the Discole® series (DKS International, Tokyo, Japan); the Jeffamine® series (Texaco, Bellaire, Tex.); and the like. Polymeric additives may be present in the ink jet inks of the present invention in amounts of from 0 to about 10% by weight of the ink composition, preferably from about 0.001% to about 8% by weight, and more preferably from about 0.01% to about 5% by weight, although the amount can be outside these ranges.

Other optional additives for the ink jet inks of the present invention include biocides such as Dowicil 150, 200, and 75, benzoate salts, sorbate salts, Proxcel® (available from ICI), and the like. When used, such biocides are generally present in an amount of from 0 to about 10% by weight of the ink composition, preferably from about 0.001% to about 8% by weight, and more preferably from about 0.01% to about 4.0% by weight, although the amount can be outside these ranges.

Other additives may also be added. For example, trimethylol propane may be added to the ink jet ink compositions to reduce paper curl or as an anti-cockle agent. These additives, such as trimethylol propane, generally have a solubility parameter in the range of from about 27 to about 35 $MPa^{1/2}$, and preferably between 29 and 33 $MPA^{1/2}$, and can bind to paper through hydrogen bonding. Other examples of such anti-curl agents include, but are not limited to, N-acetylethanolamine, N-N-diacetyl piperazine, triethylene glycol, N-(2-aminoethyl) ethanolamine, 1,4-butanediol, N-ethyl formamide, 2-methyl-1,5-pentanediol, 1,5-pentanediol, diethylene glycol, 2,2'-oxybisethanol, mixtures thereof and the like. Preferably, the concentration of such anti-curl agents in ink jet inks of the present invention is between about 5% and about 50% by weight of the ink composition and more preferably between about 10% and about 30% by weight.

Other suitable additives such as anti-mold agents, electrical conductivity adjustment agents, chelating agents and anti-rusting agents, for example, may also be added. Other additives are disclosed in U.S. Pat. No. 4,737,190 to Shimada et al., the entire disclosure of which is incorporated herein by reference.

Aqueous ink jet inks of the present invention provide numerous benefits including low product cost, high image resolution, excellent print quality on a variety of substrates, excellent jetting capability with high drop velocity, longer latency, larger drop mass or drop volume that provide optimal optical density in a single pass, excellent printhead recoverability and maintainability, excellent ink stability, and a lack of printhead kogation (or undesired heater deposit or degradation in jetting performance). In particular, the inks of the present invention provide excellent print quality with improved image quality, low image raggedness and good line edge definition. These inks further have a reduced surface tension. Pigmented ink jet inks of the present invention further provide the benefits of waterfastness and lightfastness.

The ink jet inks of the present invention preferably have a latency of at least greater than about 10 seconds and more preferably greater than about 30 seconds. The ink jet inks preferably have a frequency response of about 5–6 kilohertz; a transit time of less than about 40 microseconds or a drop velocity greater than about 10 m/sec; little or no jitter; and the drop mass can be controlled in the range of about 7.0–25 ng/drop at 600 spi. The ink jet inks also preferably have a long-term jet ink stability, up to about $2 \times 10^8$ pulses corresponding to 200 million drops.

The ink jet inks of the present invention can dry quickly to avoid inter-color bleeding even on plain papers with or without a heating device. The ink jet inks have reduced curl property.

In forming the final ink jet ink compositions of the present invention, certain physical properties should be satisfied. For example, ink compositions for use in ink jet recording processes should have appropriate viscosity and surface tension characteristics. In the present invention, it is preferred that the ink jet ink composition has a viscosity of from about 1.2 to about 6 cP at 25° C. More preferably, the viscosity is from about 1.5 to about 4.0 cP, and even more preferably from about 1.5 to about 3.0 cP. It is also preferred that the ink jet ink composition has a surface tension of from about 20–55 mN/m at 25° C. More preferably, the surface tension is from about 28–50 mN/m, and even more preferably from about 33–50 mN/m.

The invention will now be described in detail with reference to specific preferred embodiments thereof. All parts and percentages are by weight unless otherwise indicated.

EXAMPLES

Inks containing Berocell™ 584 or Berocell™ 078 are designed and formulated according to the following formula:

| Component | % by weight of the ink composition |
| --- | --- |
| Direct Black 168 (Hoechst) | 2.5% |
| Pro-Jet Cyan (IC) | 0.5% |
| Ethylene Glycol (Aldrich) | 20% |
| Polyethylene oxide (Mw = 18,500) | 0.03% |
| Berocell ™ 584 or Berocell ™ 078 | 0.01–0.03% |
| Deionized Water | to 100% |

A comparative example is made according to the above formula, substituting 3.5% isopropanol by weight as a penetrant for the Berocell™ 584 or Berocell™ 078 and appropriately adjusting the amount of deionized water. The above formulated inks, as well as two benchmark inks, are described by their properties in Table 1.

TABLE 1

Ink Type and Properties

| | Ink | Surface Tension (mN/m) | Viscosity (mPas) |
|---|---|---|---|
| Benchmark 1 | HP Deskjet 500 (black) | 43.1 | 1.34 |
| Benchmark 2 | Canon BJ10e | 40.1 | 1.77 |
| Ink 1 (comp. ex.) | 0% Berocell ™ | 42.9 | 2.46 |
| Ink 2 | +0.01% Berocell ™ 584 | 40.0 | 1.81 |
| Ink 3 | +0.02% Berocell ™ 584 | 38.4 | 1.51 |
| Ink 4 | +0.01% Berocell ™ 078 | 47.7 | 1.79 |
| Ink 5 | +0.03% Berocell ™ 078 | 34.1 | 1.77 |

The inks are evaluated on an HP Deskjet Printer using various selected acid and alkaline-sized office bond papers representing a range of roughness, porosity and sizing. The specific papers and their properties are summarized in Table 2.

TABLE 2

Physical Properties of Papers Selected for Ink Evaluation

| Paper | pH | Hercules Sizing (sec) W | Hercules Sizing (sec) F | PPS Roughness (μm) W | PPS Roughness (μm) F | PPS Porosity (mL/min) |
|---|---|---|---|---|---|---|
| 3V. Hammermill Fore DP | 8.0 | 90 | 143 | 6.0 | 5.6 | 1072 |
| 4V. Nekoosa Ardor Xerocopy | 7.3 | 107 | 77 | 6.3 | 6.7 | 490 |
| 10V. KC Classic Crest (25% cotton) | 5.5 | 379 | 301 | 6.9 | 7.3 | 201 |

The print quality performance and drying times of the various inks are tested using a test pattern comprising variable pixel lines and a solid area. The results of a three pixel line width test with line width and line width error performance measured with a CCD-type line width analyzer are shown in FIGS. 1A and 1B. As shown in FIGS. 1A and 1B, the Berocell™ modified inks demonstrate significant improvement in line width error over the comparative example and the benchmark inks. It is noted that, as compared to the comparative example, the line width in all but one case is consistently greater in the inks containing Berocell™, however the line width error is significantly lower even as compared to the two benchmark samples.

A comparison is further made against benchmark inks for systems with comparable line widths. These results are shown in Table 3.

TABLE 3

Line Width Error

| Paper | Comparison Ink | Line Width Ink (μm)* | Berocell ™ Ink | Line Width Ink (μm)* |
|---|---|---|---|---|
| Hammermill Fore DP Paper | BJ-10e | 28 | Ink 3 | 19 |
| | HP | 23 | Ink 3 | 19 |
| Nekoosa Fore DP Paper | BJ-10e | 18 | Ink 2 | 15 |
| KC Classic Crest | BJ-10e | 16 | Ink 3 | 13 |
| | HP | 19 | Ink 3 | 16 |

*Error = ±2–3μm

As can be seen in the bar graph of FIG. 1B, the Berocell™ modified inks also have an increased drying time compared with the Comparative Example and Benchmark Ink 2. However, Table 1 demonstrates that the surface tension of the 0.01% Berocell™ 584 and 0.01% Berocell™ 074 modified inks is comparable to or higher than the comparative example ink not containing the surfactant. It is believed that this demonstrates the adsorption of surfactant on the paper in a head down orientation, creating a self-sizing or hydrophobic effect. Furthermore, depletion of surfactant from the ink increases the surface tension, resulting in an increased drying time due to a lower absorption rate of the ink into the paper.

What is claimed is:

1. A thermal ink jet composition comprising:
    water;
    a co-solvent; and
    a paper specific surfactant comprising a paper pulp debonding agent, wherein said paper pulp debonding agent is a mixture of cationic and nonionic moieties.

2. The composition of claim 1, wherein the paper pulp debonding agent is a mixture of alkoxylated quarternary ammonium chloride and two different alkoxylated ethers.

3. The composition of claim 1, wherein the paper pulp debonding agent comprises a non-ionic mixture of fatty alcohol propoxylates.

4. The composition of claim 1, wherein the paper specific surfactant further comprises a surfactant selected from the group consisting of sodium lauryl sulphate, n-lauryl sarcosine, sodium dodecylbenzene sulphonate, and mixtures thereof.

5. The composition of claim 1, wherein the co-solvent is selected from the group consisting of ethylene glycol, propylene glycol, diethylene glycol, glycerine, dipropylene glycol, polyethylene glycol, and polypropylene glycol.

6. The composition of claim 5, wherein the co-solvent is ethylene glycol.

7. The composition of claim 1, further comprising a colorant.

8. The composition of claim 1, wherein the ink composition has a surface tension of from about 20 to about 55 mN/m at 25° C.

9. The composition of claim 1, wherein the ink composition has a surface tension of from about 30 to about 50 mN/m at 25° C.

10. The composition of claim 1, wherein the ink composition has a viscosity of from about 1.2 to about 6.0 cP at 25° C.

11. The composition of claim 1, wherein the ink composition has a viscosity of from about 1.5 to about 3.0 cP at 25° C.

12. The composition of claim 1, further comprising a jetting aid.

13. The composition of claim 12, wherein the jetting aid is polyethylene oxide with a weight average molecular weight of about 18,500.

14. The composition of claim 1, wherein the ink composition has a drying time ≧8 sec.

15. The composition of claim 1, wherein the paper specific surfactant is present in an amount of from about 0.0001 to about 0.10% by weight of the composition.

16. The composition of claim 1, wherein the paper specific surfactant is present in an amount of from about 0.005 to about 0.10% by weight of the composition.

17. The composition of claim 2, wherein the paper pulp debonding agent is present in an amount of from about 0.0001 to about 0.10% by weight of the composition.

18. The composition of claim 2, wherein the paper pulp debonding agent is present in an amount of from about 0.005 to about 0.05% by weight of the composition.

19. The composition of claim 4, wherein the surfactant is present in an amount of from about 0.0001 to about 0.10% by weight of the composition.

20. The composition of claim 4, wherein the surfactant is present in an amount of from about 0.005 to about 0.05% by weight of the composition.

21. An ink-jet recording process comprising ejecting ink droplets from an orifice in accordance with a recording signal to form an image on a recording medium, wherein said ink comprises water, a co-solvent, and a paper specific surfactant comprising a paper pulp debonding agent, wherein said paper pulp debonding agent is a mixture of cationic and nonionic moieties.

22. The recording process of claim 21, wherein the paper pulp debonding agent is a mixture of alkoxylated quarternary ammonium chloride and two different alkoxylated ethers.

23. The recording process of claim 21, wherein the paper pulp debonding agent comprises a non-ionic mixture of fatty alcohol propoxylates.

24. The recording process of claim 21, wherein the paper specific surfactant further comprises a surfactant selected from the group consising of sodium lauryl sulphate, n-lauryl sarcosine, sodium dodecylbenzene sulphonate, and mixtures thereof.

* * * * *